United States Patent
Banucci et al.

[19]

[11] Patent Number: 6,070,576
[45] Date of Patent: Jun. 6, 2000

[54] ADSORBENT-BASED STORAGE AND DISPENSING SYSTEM

[75] Inventors: Eugene G. Banucci, New Canaan, Conn.; Steven J. Hultquist, Raleigh, N.C.

[73] Assignee: Advanced Technology Materials, Inc., Danbury, Conn.

[21] Appl. No.: 09/088,851

[22] Filed: Jun. 2, 1998

[51] Int. Cl.[7] .................. A61M 16/00; A61M 15/00; B65D 37/00; F26B 3/00
[52] U.S. Cl. ................. 128/203.28; 128/203.12; 128/204.13; 128/204.28; 222/207; 34/472
[58] Field of Search ............ 128/203.12, 203.28, 128/204.13, 204.28, 205.13; 222/207; 34/80, 472

[56] References Cited

U.S. PATENT DOCUMENTS

| | | |
|---|---|---|
| 240,423 | 4/1881 | James . |
| 1,608,155 | 11/1926 | Barnebey . |
| 1,714,245 | 5/1929 | Schafer ................. 96/146 X |
| 2,356,334 | 8/1944 | Maude et al. . |
| 2,450,289 | 9/1948 | Marek ................. 96/146 X |
| 2,663,626 | 12/1953 | Spangler . |
| 2,987,139 | 6/1961 | Bush . |
| 2,997,371 | 8/1961 | Wadsworth et al. . |
| 3,006,153 | 10/1961 | Cook . |
| 3,080,307 | 3/1963 | Rinald ................. 96/127 X |
| 3,093,564 | 6/1963 | Weisman et al. ....... 96/127 X |
| 3,116,132 | 12/1963 | Haller et al. . |
| 3,144,200 | 8/1964 | Taylor et al. . |
| 3,176,444 | 4/1965 | Kiyonaga ................. 95/97 X |
| 3,264,803 | 8/1966 | Read ................. 96/146 X |
| 3,287,432 | 11/1966 | Sensel . |
| 3,415,069 | 12/1968 | Hauser ................. 96/126 X |
| 3,469,375 | 9/1969 | Barrington et al. .... 96/146 X |
| 3,675,392 | 7/1972 | Reighter . |
| 3,713,273 | 1/1973 | Coffee . |
| 3,719,026 | 3/1973 | Sand . |
| 3,788,036 | 1/1974 | Lee et al. . |
| 3,851,645 | 12/1974 | Connel ................. 128/204.13 |
| 4,015,599 | 4/1977 | Peterson ................. 128/204.13 |
| 4,023,701 | 5/1977 | Dockery . |
| 4,168,149 | 9/1979 | Armond et al. ........... 95/96 X |
| 4,263,018 | 4/1981 | McCombs et al. . |
| 4,343,770 | 8/1982 | Simons . |
| 4,414,005 | 11/1983 | DeBiévre et al. . |
| 4,454,879 | 6/1984 | Peterson ................. 128/204.13 |
| 4,477,265 | 10/1984 | Kumar et al. ........... 95/96 X |

(List continued on next page.)

FOREIGN PATENT DOCUMENTS

| | | |
|---|---|---|
| 1095796 | 12/1960 | Germany . |
| 2264512 | 3/1971 | Germany . |
| 3139-781 | 10/1981 | Germany . |
| 52-72373 | 12/1975 | Japan . |
| 61-133116 | 6/1986 | Japan ................. 96/126 |
| 63-88017 | 12/1986 | Japan . |
| 3-127606 | 9/1989 | Japan . |
| 1181692A | 11/1983 | U.S.S.R. . |
| 1544475A1 | 7/1987 | U.S.S.R. . |
| 1583151A1 | 5/1988 | U.S.S.R. . |

OTHER PUBLICATIONS

"Beaded Carbon UPS Solvent Recovery", *Chemical Engineering*, vol. 84, No. 18, pp. 39–40, Aug. 29, 1977.

*Primary Examiner*—John G. Weiss
*Assistant Examiner*—Todd M. Martin
*Attorney, Agent, or Firm*—Steven J. Hultquist; Oliver A. M. Zitzmann

[57] ABSTRACT

A gas storage and dispensing system, including a gas storage and dispensing vessel, holding a physical adsorbent medium having sorptive affinity for the gas, and desorptive thereof under dispensing conditions. The gas may be an organoleptic gas, a gaseous therapeutic agent, or the like. The gas storage and dispensing system may be constructed with the gas storage and dispensing vessel in gas flow communication with a bladder that is actually manually or mechanically actuated to effect compression and release thereof, to achieve pressure differential-mediated desorption of the gas from the physical adsorbent medium, and discharge of desorbed gas from the vessel.

18 Claims, 5 Drawing Sheets

U.S. PATENT DOCUMENTS

| | | | |
|---|---|---|---|
| 4,552,571 | 11/1985 | Dechene | 95/96 X |
| 4,578,256 | 3/1986 | Nishino et al. | |
| 4,673,415 | 6/1987 | Stanford | 95/96 X |
| 4,723,967 | 2/1988 | Tom | 96/108 X |
| 4,738,693 | 4/1988 | Tom | 96/108 X |
| 4,738,694 | 4/1988 | Godino et al. | 96/126 X |
| 4,744,221 | 5/1988 | Knollmueller | 62/48 |
| 4,749,384 | 6/1988 | Nowobilski et al. | |
| 4,761,395 | 8/1988 | Tom et al. | 502/401 |
| 4,869,733 | 9/1989 | Stanford | 95/96 X |
| 4,881,958 | 11/1989 | Eckardt et al. | 96/127 |
| 4,922,901 | 5/1990 | Brooks et al. | 128/204.13 |
| 5,051,117 | 9/1991 | Prigge et al. | 95/95 |
| 5,089,244 | 2/1992 | Parent et al. | |
| 5,114,440 | 5/1992 | Reiss | 95/96 |
| 5,133,787 | 7/1992 | Diot et al. | |
| 5,151,395 | 9/1992 | Tom | |
| 5,202,096 | 4/1993 | Jain | 96/126 X |
| 5,224,350 | 7/1993 | Mehra | 95/96 X |
| 5,238,469 | 8/1993 | Briesacher et al. | 96/126 X |
| 5,338,579 | 8/1994 | Ogawa et al. | 428/448 |
| 5,385,689 | 1/1995 | Tom et al. | 252/194 |
| 5,409,526 | 4/1995 | Zheng et al. | |
| 5,417,742 | 5/1995 | Tamhankar et al. | |
| 5,518,528 | 5/1996 | Tom et al. | |
| 5,707,424 | 1/1998 | Tom et al. | 95/95 |

ADSORBENT-BASED STORAGE AND DISPENSING SYSTEM

BACKGROUND OF THE INVENTION

1. Field of the Invention

The present invention relates to an adsorbent-based system for storage and dispensing of gases.

2. Description of the Related Art

U.S. Pat. No. 5,518,528 issued May 21, 1996 to Glenn M. Tom, et al., the disclosure of which hereby is incorporated herein by reference in its entirety, describes a storage and delivery system for gases such as those used in industrial manufacturing of semiconductor devices.

The storage and delivery system described in the Tom, et al. patent comprises a vessel containing a bed of a physical adsorbent material having affinity for the gas to be stored and dispensed. The physical adsorbent material is loaded by physical adsorption of the desired gas thereon, by charging of the gas into the vessel, and the gas subsequently is dispensed from the storage and delivery vessel by desorption of the gas from the physical adsorbent medium. Such desorption of the gas may take place by pressure differential-mediated desorption, concentration different-mediated desorption, and/or by thermal desorption of the gas from the physical adsorbent material. The desorbed gas then is selectively discharged from the storage and dispensing vessel in the dispensing operation.

For dispensing purposes, the vessel may be equipped with a valve head assembly of the type normally employed on gas cylinders, and such valve head assembly may be coupled with piping, conduits, manifolds, or other flow circuitry, to carry out the dispensing operation.

The dispensing operation may for example be carried out by imposing a reduced pressure exterior of the flow circuitry associated with the flow storage and dispensing vessel, relative to the pressure prevailing in the interior volume of the vessel. If the interior vessel pressure is on the order of one atmosphere, a pressure differential can be imposed by appropriate vacuum or suction applied to the vessel, to effect reduced pressure desorption of the previously adsorbed gas.

The interior pressure of the cylinder alternatively may be maintained during gas storage at super-atmospheric pressure, whereby opening of the cylinder to a pressure at or near ambient effects flow of gas from the sorbent in the vessel to the exterior environment, under the control of a mass flow controller or other flow control means.

As a still further alternative, a motive fluid driver, such as a pump, fan, turbine, ejector, eductor, pressure-building circuit, cryopump, compressor, blower, etc. may be employed to extract the gas from the physical adsorbent material, via desorption therefrom of the gas and flow to the motive fluid driver for subsequent distribution or dispensing.

As disclosed in the Tom, et al. patent, heating of the sorbent may be carried out, in addition or as a further alternative to the foregoing dispensing modes, to desorb the sorbate gas from the sorbent material for discharge from the storage and dispensing vessel.

As yet another alternative for operation of a gas storage and dispensing system of the general type described in the Tom et al. patent, such system may be constructed for selective flow of a carrier gas through the storage and dispensing vessel. Such carrier gas flow provides a concentration differential to effect desorption of gas from the physical adsorbent material so that the desorbed gas is entrained in the carrier gas stream and subsequently discharged from the vessel.

The physical adsorbent material-based gas storage and dispensing system of the Tom et al. patent has proven highly successful in commercial deployment as a gas source for semiconductor manufacturing operations, such as ion implantation.

There is continuing effort to discover and develop new uses for physical adsorbent material-based gas storage and dispensing systems of the type described in the Tom et al. patent.

SUMMARY OF THE INVENTION

In one aspect, the invention relates to a gas storage and dispensing system, comprising:

a gas storage and dispensing vessel, holding a physical adsorbent medium having sorptive affinity for the gas, and desorptive thereof under dispensing conditions;

a compressible bladder defining an interior volume therewithin;

a first conduit interconnecting the bladder and vessel in gas flow communication;

a first unidirectional flow control valve in said first conduit, permitting flow only from the vessel to the bladder;

a second conduit coupled at a first end thereof in gas flow communication with the bladder and terminating at a second, discharge end thereof;

a second unidirectional flow control valve in said second conduit, permitting flow only from second bladder to the second, discharge end of said second conduit;

a third conduit coupled at a first end thereof in gas flow communication with the vessel and terminating at a second, inlet end thereof;

a third unidirectional flow control valve in said third conduit, permitting flow only from an ambient environment into the vessel;

wherein:

compression of the bladder effects discharge of gas in the interior volume thereof through the second conduit to the second, discharge end thereof;

subsequent release of the bladder after discharge of gas therefrom exerts a reduced pressure dispensing condition on the physical adsorbent medium, to effect desorption of gas from the physical adsorbent medium, flow of desorbed gas from the vessel through the first conduit to the bladder, and reduction of gas pressure in the vessel;

reduction of gas pressure in the vessel effects flow of ambient gas from the ambient environment through the third conduit into the vessel to relieve underpressure resulting from reduction of gas pressure in the vessel; and subsequent manual compression of the bladder effects dispensing of desorbed gas from the bladder, at the second, discharge end of the second conduit;

whereby repetitive compression and relaxation of the bladder is employable for dispensing of a desired quantity of the gas.

Another aspect of the invention relates to a storage and dispensing system for organoleptic gas, comprising:

a gas storage and dispensing vessel;

a physical adsorbent material in the vessel having sorptive affinity for the organoleptic gas, and from which the organoleptic gas is desorbable under dispensing conditions;

an organoleptic gas sorptively retained on said physical sorbent material; and means for generating dispensing conditions for desorption of the organoleptic gas from the physical adsorbent material and discharging the organoleptic gas from the vessel.

A still further aspect of the invention relates to a storage and dispensing system for a gaseous therapeutic agent, comprising:

a gas storage and dispensing vessel;

a physical adsorbent material in the vessel having sorptive affinity for the gaseous therapeutic agent, and from which the gaseous therapeutic agent is desorbable under dispensing conditions;

a gaseous therapeutic agent sorptively retained on said physical sorbent material; and means for generating dispensing conditions for desorption of the gaseous therapeutic agent from the physical adsorbent material and discharging the gaseous therapeutic agent from the vessel.

A still further aspect of the invention relates to a storage and dispensing device of a body-mountable or body-wearable conformation, comprising a receptacle holding a physical adsorbent sorptively retaining a material to be dispensed, and including a dispensing structure for discharging desorbed material from the receptacle, wherein in a body-mounted or body-worn state, body heat warms the receptacle and physical adsorbent to effect desorption and dispensing of the material from the receptacle.

In another aspect, the invention relates to a process for supplying a gas, comprising:

providing a storage and dispensing vessel containing a solid-phase physical adsorbent medium having the gas adsorbed thereon, and from which the gas is desorbable under dispensing conditions; and selectively desorbing at least a portion of said gas from the physical adsorbent medium under dispensing conditions and discharging the gas from the vessel, wherein the dispensing conditions include a desorption condition selected from the group consisting of: (a) pressure differential desorption conditions, (b) concentration differential desorption conditions, and (c) thermal desorption conditions, and wherein the gas comprises a gas species selected from the group consisting of organoleptic gas species, pesticidal gas species, and gaseous therapeutic agents.

Other aspects, features and embodiments of the invention will be more fully apparent from the ensuing disclosure and appended claims.

DETAILED DESCRIPTION OF THE INVENTION, AND PREFERRED EMBODIMENTS THEREOF

In the practice of the invention, a wide variety of gases, e.g., organoleptic gases such as scents, perfumes, fragrances, aromatherapeutic agents, room freshening vapors, fogging agents, etc., therapeutic agents such as lung surfactants, antihistamines, bronchodilators, etc., as well as any other suitable gas species may readily be stored and dispensed using a storage and dispensing vessel holding a sorbent medium having sorptive affinity for such gas, with desorption of the gas being effected by differential pressure, differential concentration, and/or thermal desorption conditions.

As used herein, the terms "gas" and "gaseous" are intended to be construed as broadly encompassing gases per se as well as vapors.

Figure 1:
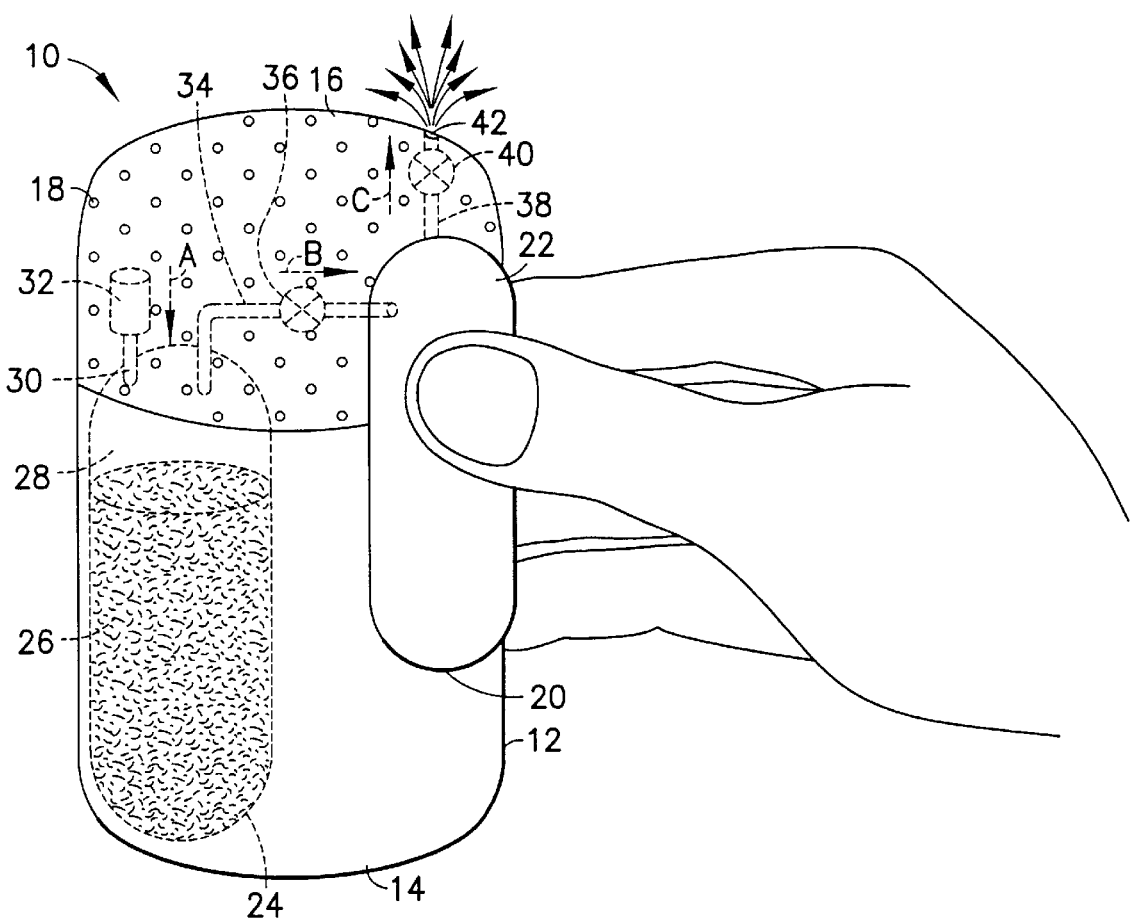
FIG. 1 is a perspective view of a pump-action storage and dispensing device according to one embodiment of the present invention.

Referring now to the drawings, FIG. 1 is a perspective view of a pump-action gas storage and dispensing device according to one embodiment of the present invention. Such device may be utilized to dispense a fragrance or other organoleptic material, or alternatively a therapeutic agent such as a medicament.

The storage and dispensing device 10 comprises a housing 12 having a lower portion 14 which is imperforate in character, and an upper potion 16 having pores 18 therein to provide gas flow communication between the interior volume of the container 12 and the exterior environment.

In a recess 20 in a side surface portion of the container is disposed a manually-actuated pump bladder 22, which is coupled by means of conduit 34 having unidirectional flow valve 36 therein, to a sorbent medium container 24 holding a bed 26 of sorbent material.

The manually-actuated bladder 22 also is joined to conduit 38 in the interior volume of vessel 12. Conduit 38 contains unidirectional flow valve 40 therein, and communicates with the gas dispensing port 42 at an upper surface of vessel 12.

The gas dispensing port may directly communicate with the ambient environment of the device, as shown, when it is desired to discharge the dispensed gas to the atmosphere or surrounding gas environment of the device. Such direct flow to the ambient environment may for example be desirable in the case of dispensed gases such as fragrances, room fresheners or other organoleptic media, or alternatively in the case of a therapeutic agent such as a decongestant or inhalant that is therapeutically beneficial when dispensed in proximity to the nose of a user.

Although the dispensing port 42 is shown as a simple orifice, it will be appreciated that such port may be coupled with or contain suitable dispensing or dispersing means such as nozzles, jets, gas distributors, gas flow directing means, catheters, breathing masks, sprayer heads, etc., for delivery of the dispensed gas to a desired end-use locus.

The adsorbent container 24 is disposed in the interior volume of vessel 12 and is provided with an air intake conduit 30 coupled at its upper end to unidirectional flow pressure relief valve 32. By such arrangement, air from the ambient environment of vessel 12 can be drawn through pores 18 into the interior volume of vessel 12 and flow through the pressure relief unidirectional flow valve 32 and conduit 30 into the head space 28 of container 24, when the interior volume of container 24 is below ambient pressure.

The pressure relief valve 32 accommodates unidirectional flow in the direction indicated by arrow A through associated conduit 30 into the interior volume head space 28 of container 24. Unidirectional flow valve 36 accommodates flow in direction B through conduit 34 joining the interior volume of container 24 with the interior volume of bladder 22. Unidirectional flow valve 40 accommodates flow of gas from the interior volume of bladder 22 through conduit 38 in the direction C.

Accordingly, valves 32, 36 and 40 are one-way valves, accommodating flow of gas only in the respective directions A, B and C.

The bed 26 of physical adsorbent medium in container 24 may comprise any suitable material having sorptive affinity for the material to be stored and subsequently dispensed from the vessel 12 through dispensing port 42. For example, such physical adsorbent medium may comprise activated carbon, molecular sieve, sorbent clays, silica, alumina, porous silicon, macroreticulate polymer resins, etc., the choice of specific sorbent medium depending on the sorptive capacity (loading) that is desired to be accommodated by the physical adsorbent material in relation to the material to be dispensed, and the desorption characteristics of such gas to be dispensed on the particular physical adsorbent material.

A preferred physical adsorbent material in many applications may comprise so-called bead activated carbon forms of activated carbon, where the beads, i.e., highly uniform diameter spherical particles, may have a diameter in the range of from about 0.25 to about 2 millimeters diameter. Suitable commercially available bead activated carbon materials are more fully described in U.S. Pat. No. 5,704,965 issued Jan. 6, 1998 in the names of Glenn M. Tom, et al., the disclosure of which is hereby incorporated herein by reference in its entirety.

In operation of the FIG. 1 system, subsequent to loading of the bed 26 of physical adsorbent material with an appropriate gaseous material, the gas is sorptively retained on surfaces and in pores of the physical adsorbent material in bed 26. The sorptively retained gas may be selectively dispensed by manual compression of the bladder 22. By squeezing bladder 22, gas in the interior volume of the bladder is expelled through conduit 38 in the direction C and is dispensed from dispensing port 42 as illustrated by the arrows in the FIG. 1 drawing at such port.

Concurrently, the compression of bladder 22 and expulsion of gas therefrom causes gas from head space 28 of container 24 to flow through conduit 34 in the direction of arrow B, as the compressive force on bladder 22 is manually released.

By such release of the bladder 22 subsequent to manual compression thereof, a vacuum is exerted on the head space 28 and bed 26 of adsorbent material, effecting desorption of gas from the adsorbent, and flow of the desorbed gas through conduit 34. Such flow of gas from container 24 through conduit 34 to bladder 22 then causes the internal pressure of container 24 to be decreased below ambient (atmospheric) pressure, resulting in the unidirectional pressure relief valve 32 opening to permit in-flow of air from the exterior of container 24 through conduit 30 in the direction indicated by arrow A.

By such arrangement, the bladder 22 of the FIG. 1 storage and dispensing assembly may be repetitively manually pumped, to elicit gas from the sorbent bed 26, for dispensing at dispenser port 42. When bladder 22 is released from manual compression, the bladder relaxes to its uncompressed state, and the system thereafter is maintained in a storage mode, permitting subsequent selective dispensing action by renewed manual compression of bladder 22.

The storage and dispensing system shown in FIG. 1 may be constructed of any suitable size, but preferably is of a hand-held size appropriate to the function of the manual squeeze pump actuation device for dispensing, as described above.

The organoleptic material adsorbed on the adsorbent medium for subsequent dispensing may comprise any suitable material including scents, perfumes, fragrances, aromatherapeutic agents, room freshening vapors, fogging agents, pesticidal agents, pest-repellent agents, visually discernible gas agents for visual effects, etc. Specific examples of organoleptic materials include essential oils derived from plant products such as lavender, rosemary, chamomile, wormwood, ylang—ylang, arnica, t-tree, geranium extracts, mint, patchouli, citrus oils, lilac extracts, ginger oil, cinnamon oil, cedar oils, and other essential oils, extracts and volatile plant products.

Figure 2:
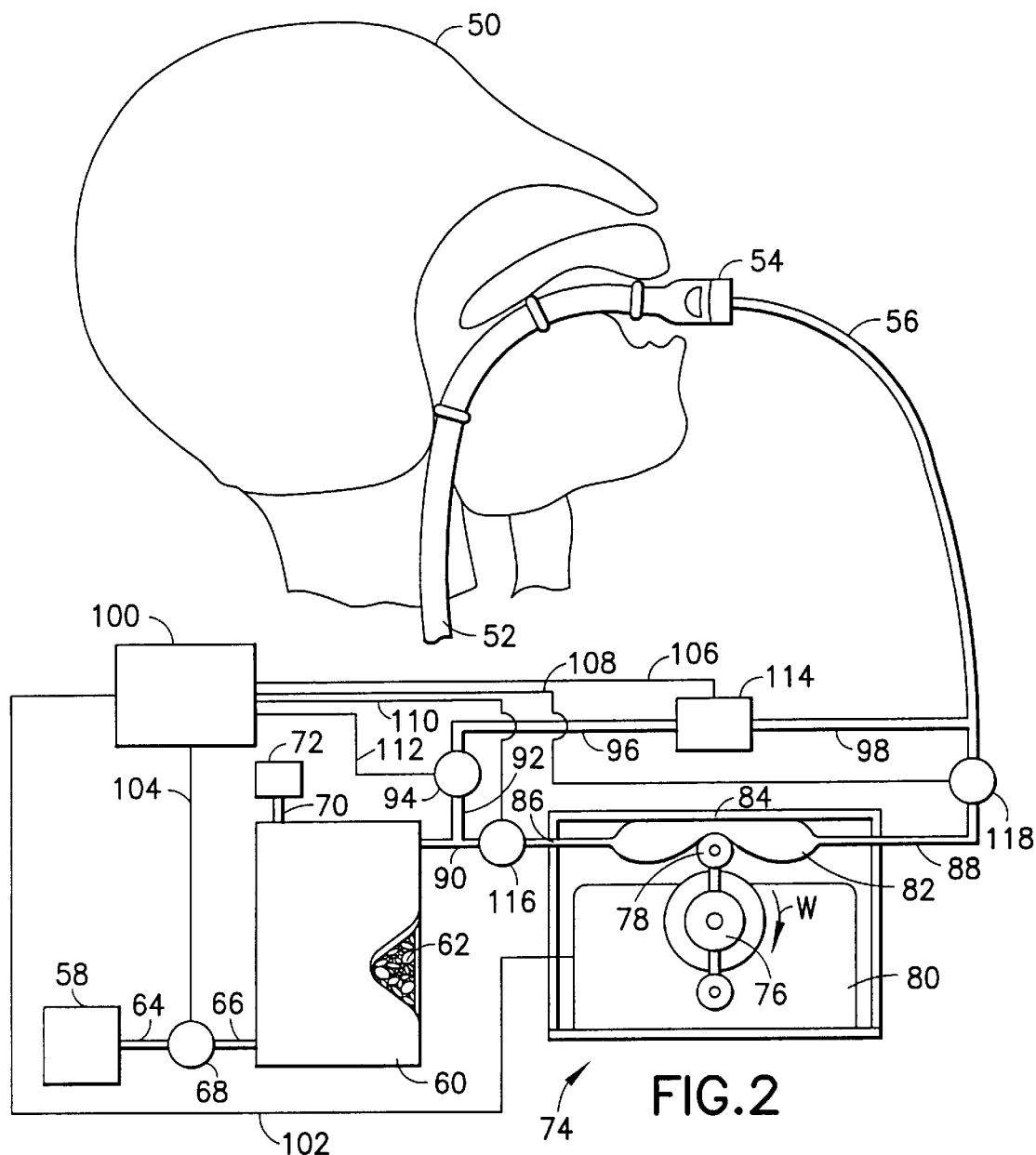
FIG. 2 is a schematic representation of a patient receiving respiratory support and medication by a physical adsorbent material-based gas storage and dispensing system according to another embodiment of the invention.

FIG. 2 is a schematic representation of a patient 50 receiving respiratory support and medication by means of an endotracheal tube 52, coupled to a physical adsorbent material-based gas storage and dispensing system according to another embodiment of the invention.

The gas storage and dispensing system of FIG. 2 includes a gas storage and dispensing vessel 60 enclosing an interior volume holding a physical adsorbent material 62 on which is sorptively retained a therapeutic agent for subsequent desorption and dispensing. The vessel 60 is equipped with a one-way flow pressure relief valve 72 by means of pressure relief conduit 70 interconnecting valve 72 and vessel 60.

The gas storage and dispensing system comprises a peristaltic pump 74 including rollers 78 on a drive shaft 76 operatively connected to drive motor 80, for rotation of the drive shaft in the direction indicated by arrow W.

The pump 74 is arranged with a peristaltic compression plate 84 providing a bearing surface for a bladder 82. The bladder 82 thus is subjected to peristaltic action by the roller 78 as the drive shaft 76 is rotated.

The bladder 82 is coupled at one end thereof with the vessel 60 by means of conduits 86 and 90, between which is a one-way flow valve 116. The bladder 82 is joined at an opposite end (from the juncture of the bladder with conduit 86) to a discharge conduit 88 that communicates with delivery conduit 56 as shown, with one-way valve 118 disposed between the respective conduits 56 and 88.

Delivery conduit 56 in turn is joined to the endotracheal tube 52 by means of coupling 54.

By means of the gas storage and dispensing system above described, dispensing operation may be effected in a manner analogous to that described hereinabove with reference to the FIG. 1 storage and dispensing device. The therapeutic agent sorptively retained on physical adsorbent material 62 is desorbed therefrom during peristaltic pumping action on the bladder 82, which causes pressure differential-mediated desorption of the therapeutic agent and flow thereof through conduit 90, one-way flow valve 116, and conduit 86. From conduit 86, the desorbed gas flows into the interior volume of bladder 82 and is peristaltically pumped to discharge conduit 88. The desorbed gas then flows through one-way flow valve 118 and delivery conduit 56 to the endotracheal tube 52 for administration to the patient 50.

In an alternative mode of action of the gas storage and dispensing system of FIG. 2, a source 58 of carrier gas, such as for example a cylinder of compressed air, may be provided in flow communication with vessel 60 by means of conduits 64 and 66 having flow control valve 68 disposed therebetween. By such arrangement, carrier gas from source 58 may be flowed through conduit 64, valve 68 and conduit 66 to the interior volume of vessel 60, for flow therethrough and egress into conduit 90.

In such manner, a concentration differential is created by the flow of the carrier gas, to mediate desorption of the therapeutic agent from the physical adsorbent material. The resultingly desorbed therapeutic agent is entrained in the carrier gas and discharged in conduit 90.

During such flow-through dispensing, valves 116 and 118 may be closed, so that the carrier gas stream containing the therapeutic agent flows from conduit 90 into conduit 92. From conduit 92, the carrier gas stream containing the therapeutic agent flows through flow control valve 94, conduit 96, optional flow assembly 114, and conduit 98 to the delivery conduit 56, for administration of the therapeutic agent to the patient via the endotracheal tube 52.

The flow assembly 114 may comprise any suitable means, as for example a mass flow controller, flow-limiting valve, pump, blower, pressure monitoring device, thermocouple or other temperature sensing means, concentration monitoring means, or the like, that is usefully employed in monitoring, operating and/or controlling the system.

The gas storage and dispensing system of FIG. 2 thus has been illustrated with alternative dispensing arrangements, including a first arrangement in which the peristaltic pump is actuated to extract the therapeutic agent from the storage and dispensing vessel, in a manner analogous to the storage and dispensing device of FIG. 1, and a second arrangement in which carrier gas is flowed through the storage and dispensing vessel to effect desorption and entrainment of the therapeutic agent in the carrier gas stream.

In a specific application, the gas storage and dispensing system may be constructed to effect only one of such modes of operation, or the system may be alternatively constructed as schematically shown, to accommodate alternative usage in either of such modes of operation.

The FIG. 2 system may further comprise a central processing unit 100, including a microprocessor, microcontroller, computer, or the like, which is constructed and arranged to monitor and/or control the process.

For example, in the illustrative embodiment shown, the central processing unit 100 is connected by signal control line 104 to valve 68, by signal control line 102 to peristaltic pump drive motor 80, by signal control line 106 to flow assembly 114, by signal control line 108 to valve 118, by signal control line 110 to valve 116, and by signal control line 112 to valve 94. By such control arrangement, the respective motor, valves and flow assembly may be actuated and operated to effect dispensing of a therapeutic agent in a selected manner, to maximize therapeutic benefit to the patient.

Illustrative of therapeutic agents that may be administered using the storage and dispensing system as shown in FIG. 2 are lung surfactants or precursors thereof (precursors being materials or substances which are converted in situ in the pulmonary locus to surfactant material), terbutaline, salbutamol, dexamethasone, chromolyn sodium and pentamidine. The therapeutic agent may include medicaments such as bronchodilators, antihistamines, and drugs for the treatment of cystic fibrosis. The storage and dispensing system may utilize a breathing circuit, inhalation mask, or other drug delivery device for delivery to the lungs and alveoli of the patient of the gas-phase medicament.

FIG. 3 is a perspective view of a bracelet 150 including a band member 154 of suitable heat-conductive material, such as a metal, or a high thermal conductivity plastic material.

Although shown as being of continuous form for ease of description, it will be appreciated that the bracelet may include suitable clasp or other coupling means, whereby the bracelet can be separated into free ends for application to and removal from the wrist of the wearer. Alternatively, the band 154 may be of a resilient elastic or otherwise expandable material, to accommodate placement and removal of the bracelet in relation to the wrist of a wearer. As a still further alternative, the band 154 may be of a rigid continuous material, whereby the bracelet is slipped over the hand and onto the wrist of a wearer.

Mounted on band 154 is at least one dispensing compartment 152, for dispensing of organoleptic material gas.

FIG. 4 is a partial cross-sectional elevation view, showing the details of the dispensing component of the bracelet 150. As illustrated, the dispensing compartment 152 comprises a gas-permeable porous wall 156 enclosing an interior volume 158 containing sorbent material 160. The sorbent material 160 is suitably loaded with organoleptic material, e.g., at the time of manufacture of the bracelet, or subsequent thereto by placement of the bracelet in a high pressure chamber containing the organoleptic material gas, so that the organoleptic material gas permeates the porous wall 156 and is sorptively taken up by the sorbent material 160 in the interior volume 158 of the dispensing compartment 152.

In use, the bracelet is mounted on the wrist of a wearer so that band 154 is at least in partial contact with the skin of the wearer. As a result of the thermally conductive character of band 154, the body heat of the wearer is transmitted, as illustrated by heat flux Q in the drawing, through conductive band 154 to the sorbent material 160. As a result, the sorbent material is warmed by the body heat of the wearer, resulting in thermally-mediated desorption of organoleptic material gas from the sorbent and flow of same outward through permeable wall 156 in the direction indicated by arrow F, as well as correspondingly permeation through the gas-permeable side walls of the compartment.

By the construction shown in FIG. 4, the bracelet in response to thermal flux transmitted from the wearer's body effects sustained desorption release of the organoleptic material. The gas-permeable wall may be formed of any suitable porous or otherwise gas-permeable material of construction, such as sintered metal, porous plastic, or the like.

FIG. 5 is a perspective view of a storage and dispensing device 170 according to another embodiment of the invention.

The assembly 170 comprises a storage and dispensing vessel 172 having an upper portion 174 secured to neck structure 178, through which desorbed gas may be flowed as hereinafter more fully described, to the spherical dispenser element 180, which is of a porous or otherwise gas-permeable character.

Vessel 172 at its lower portion 176 is secured to the base member 182 comprising top flat wall 184 and side wall 186. The vessel 172 is also secured in heat transfer relationship with the extended heat transfer surface elements 188 which extend longitudinally along a major portion of the length of vessel 172, each terminating at an upper end 164 and having a lower foot portion 190 that is in extended heat transfer contact with the top wall 184 of base 182.

In such arrangement, the extended heat transfer surface elements 188 may be brazed, welded, soldered, or otherwise affixed in heat transfer contact to the wall surface of vessel 172.

The base 182 is appropriately sized to overlie and repose on a heating element 192 such as a heating element of a conventional stove. For this purpose, base 182 may comprise a conventional burner cover for stoves, which has been adapted by securement of the vessel 172 thereto, e.g., by welding, brazing, or otherwise being secured in place on the base 182.

Alternatively, the device 170 may be integrated with a self-contained heating element, such as a heating coil, flame-generating element, or the like.

Figure 5:
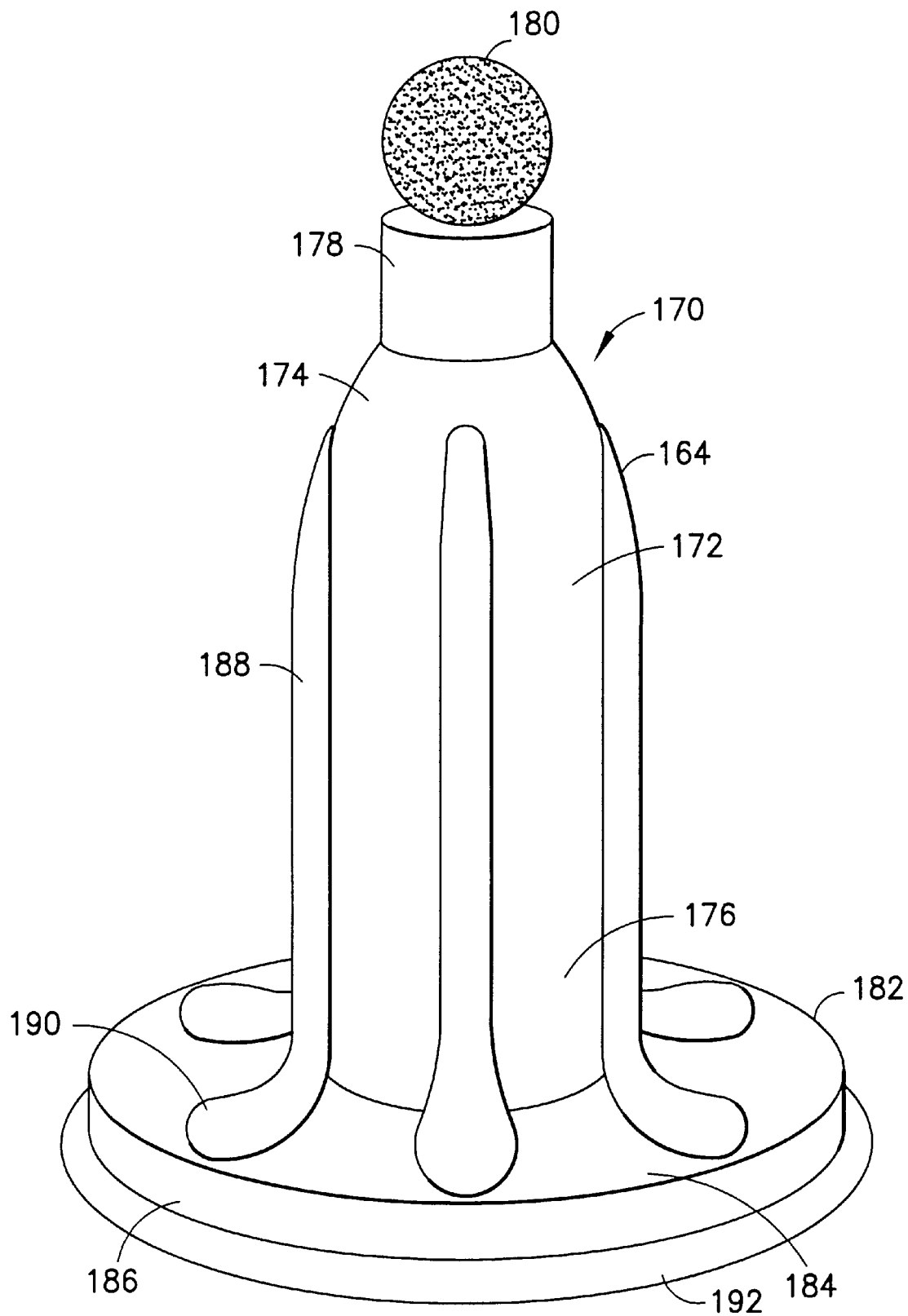
FIG. 5 is a perspective view of a storage and dispensing device according to a further embodiment of the invention, shown reposed on a heating element.
Figure 6:
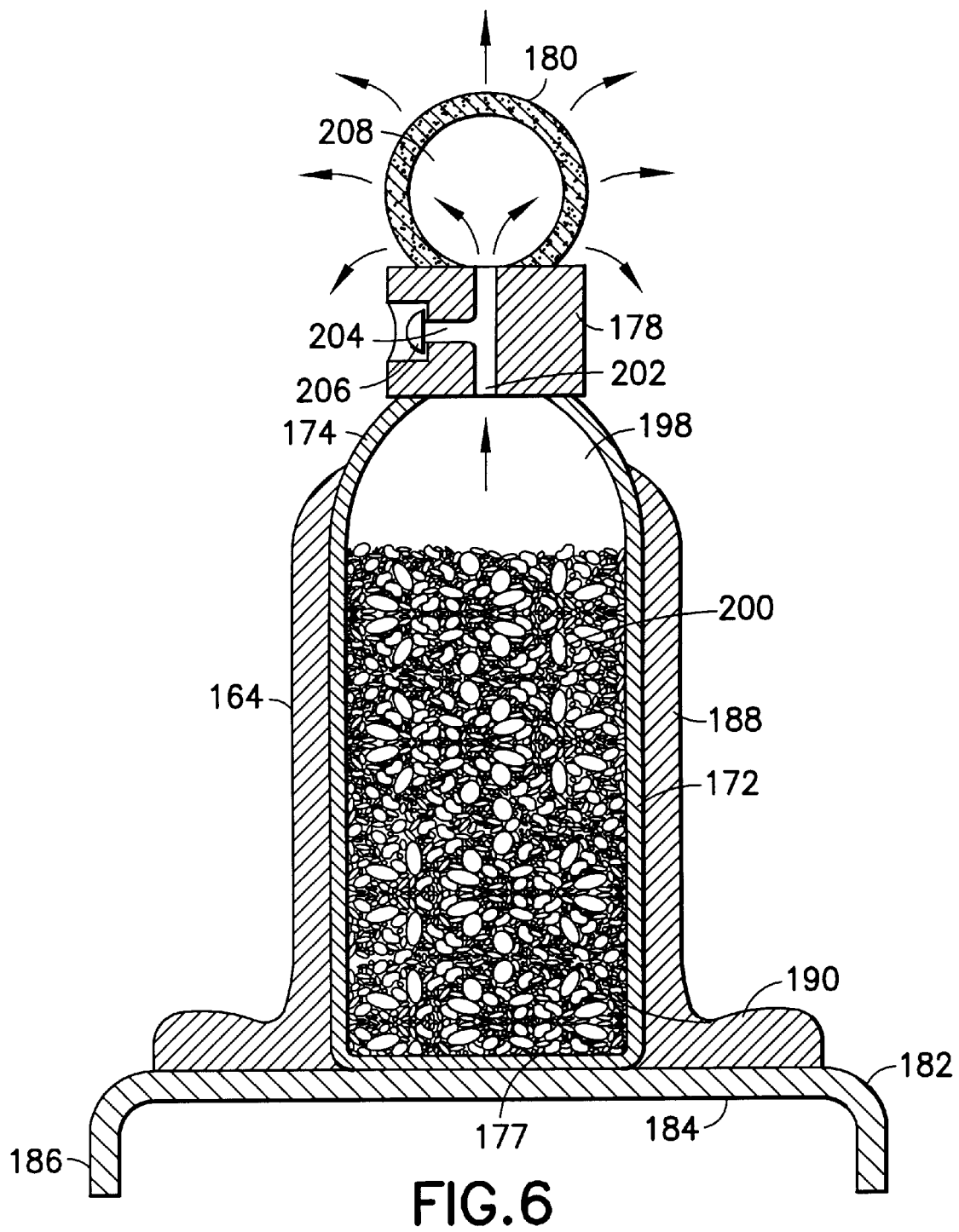
FIG. 6 is a cross-sectional elevation view of the storage and dispensing device of FIG. 5.

FIG. 6 is a sectional elevation view of the storage and dispensing assembly 170 of FIG. 5, showing the internal structure and details of construction thereof. As shown in FIG. 6, the vessel 172 has a floor member 177, which is abuttingly reposed on the upper surface of top wall 184 of base 182. Vessel 172 contains an interior volume 198 holding a mass of sorbent material 200, which is suitably loaded with adsorbed gas.

The neck member 178 of the vessel has a main gas flow passage 202 therein which intercommunicates the interior volume 198 of vessel 172 and the interior volume 208 of spherical dispenser element 180. By such arrangement, desorbed gas can flow in the direction indicated by the arrow into main gas flow passage 202 from the interior volume 198 head space, and then flow into the interior volume 208 for out-flow permeation of such gas through the gas-permeable wall of spherical dispenser element 180.

The main gas flow passage 202 in neck member 178 also communicates with a gas pressure relief passage 204 which is arranged in flow communication with a pressure relief valve 206. The pressure relief valve may comprise a conventional pop valve or other pressure relief assembly, which in response to pressure exceeding a particular value, opens to reduce internal pressure in the storage and dispensing assembly to a lower acceptable pressure level.

By the structure shown in FIGS. 5 and 6, the storage and dispensing assembly having sorbent material 200 in the interior volume of the vessel 172 may be heated by reposing the base 182 over the heating element of a stove, followed by actuation of the stove heating element. The base 182 is resulting heated to a temperature at which heat is transferred from top wall 184 into vessel 172 through floor member 177 thereof, as well as through the side walls via the extended heat transfer surface elements 188.

In consequence of the foregoing, heat is transmitted to the sorbent material 200, resulting in thermally-mediated desorption of the sorbent material, to thereby release the gas, which flows through the head space of vessel 172, through neck member 178 and into interior volume 208 of the dispensing element 180, for permeation from such dispensing element into the exterior environment.

The storage and dispensing system shown in FIGS. 5 and 6 may be employed to dispense an aromatic ester or other organoleptic material gas, as an air freshener, fragrance, or other perceptible gas medium.

Alternatively, the storage and dispensing assembly 170 shown in FIGS. 5 and 6 may be arranged for thermally-mediated desorption and dispensing of an insecticidal agent, or other medium which is cidal for a pest species.

As a still further alternative, the storage and dispensing assembly 170 shown in FIGS. 5 and 6 may be employed to dispense a repellent medium for a pest species, e.g., citronella vapor for repelling mosquitoes in the vicinity of the thermally-actuated storage and dispensing assembly.

Accordingly, such assembly could be employed as a repellent dispensing device which is usefully employed with small-scale propane camp stoves and the like, to rid a campsite area of mosquitoes and other insect pests.

It will therefore be appreciated that the gas storage and dispensing system of the present invention may be widely employed to store and dispense a wide variety of gas species.

While the invention has been illustratively described herein with respect to specific embodiments, it will be recognized that the invention is not thus limited, but may be configured, arranged and constituted in other forms for other modes of operation. Accordingly, the invention is intended to be broadly construed as including within the scope of the ensuing claims all variations, modifications, and other embodiments as will readily suggest themselves to ordinary skill in the art, based on the disclosure herein.

What is claimed is:

1. A gas storage and dispensing system, comprising:

a gas storage and dispensing vessel, holding a physical adsorbent medium having sorptive affinity for the gas, and desorptive thereof under dispensing conditions;

a compressible bladder defining an interior volume therewithin;

a first conduit interconnecting the bladder and vessel in gas flow communication;

a first unidirectional flow control valve in said first conduit, permitting flow only from the vessel to the bladder;

a second conduit coupled at a first end thereof in gas flow communication with the bladder and terminating at a second, discharge end thereof;

a second unidirectional flow control valve in said second conduit, permitting flow only from the bladder to the second, discharge end of said second conduit;

a third conduit coupled at a first end thereof in gas flow communication with the vessel and terminating at a second, inlet end thereof;

a third unidirectional flow control valve in said third conduit, permitting flow only from an ambient environment into the vessel;

wherein:

compression of the bladder effects discharge of gas in the interior volume thereof through the second conduit to the second, discharge end thereof;

subsequent release of the bladder after discharge of gas therefrom exerts a reduced pressure dispensing condition on the physical adsorbent medium, to effect desorption of gas from the physical adsorbent medium, flow of desorbed gas from the vessel through the first conduit to the bladder, and reduction of gas pressure in the vessel;

reduction of gas pressure in the vessel effects flow of ambient gas from the ambient environment through the third conduit into the vessel to relieve underpressure resulting from reduction of gas pressure in the vessel; and subsequent compression of the bladder effects dispensing of desorbed gas from the bladder, at the second, discharge end of the second conduit;

whereby repetitive compression and relaxation of the bladder is employable for dispensing of a desired quantity of the gas.

2. The system of claim 1, wherein the bladder is manually compressible and relaxable.

3. The system of claim 1, having a manually actuatable and hand-held character.

4. The system of claim 1, wherein a peristaltic pump is operatively coupled with the bladder to repetitively compress and relax same for dispensing.

5. The system of claim 1, further comprising a gas physically adsorbed on the physical adsorbent material.

6. The system of claim 1, wherein the gas comprises an organoleptic gas.

7. The system of claim 1, wherein the gas comprises a therapeutic agent.

8. The system of claim 1, wherein the physical adsorbent material comprises an adsorbent selected from the group consisting of silica, alumina, molecular sieve, carbon, macroreticulate resin, kieselguhr, and porous silicon.

9. A gas storage and dispensing system, comprising:

a gas storage and dispensing vessel;

a physical adsorbent material in the vessel having sorptive affinity for the gas, and from which the gas is desorbable under dispensing conditions;

a gas sorptively retained on said physical sorbent material; and a dispensing assembly for generating dispensing conditions for desorption of the gas from the physical adsorbent material and discharging desorbed gas from the vessel, said dispensing assembly comprising:

a carrier gas source;

an inflow passage joining the gas storage and dispensing vessel in fluid flow communication with the carrier gas source;

a unidirectional flow control valve in the inflow passage permitting flow only of carrier gas from the carrier gas source into the vessel in response to an underpressure condition in the vessel;

a pump;

a first outflow passage joining the vessel in fluid flow communication with the pump;

a second outflow passage joined in fluid flow communication to the pump and terminating at a discharge end for discharging desorbed gas from the system;

wherein the pump is operable to exert pumping action on the vessel for reduction of pressure therein to cause the unidirectional valve in the inflow passage to open in response to underpressure in the vessel and effect flow of the carrier gas into the vessel through the inflow passage, thereby providing said dispensing conditions involving desorption of the gas from the physical adsorbent material and into the carrier gas flow, with said pump effecting flow of desorbed gas through the first and second outflow passages for discharge of desorbed gas from the system at the discharge end of the second outflow passage.

10. The system according to claim 9, wherein the gas comprises a material selected from the group consisting of scents, perfumes, fragrances, aromatherapeutic agents, room freshening vapors, pesticidal agents, pest-repellent agents, visually discernible gas agents, essential oils, extracts and volatile plant products.

11. The system according to claim 9, wherein the physical adsorbent material comprises a material selected from the group consisting of carbon, molecular sieve, silica, alumina, macroreticulate polymers, kieselguhr and porous silicon.

12. The system according to claim 9, wherein the gas comprises a gaseous therapeutic agent for treatment of a patient.

13. The system of claim 12, wherein the gaseous therapeutic agent comprises a medicament selected from the group consisting of bronchodilators, antihistamines, lung surfactants, antiviral agents and antibacterial agents.

14. The system of claim 12, wherein the gaseous therapeutic agent is therapeutically active at a pulmonary locus.

15. A storage and dispensing device of a body-mountable or body-wearable conformation, comprising a receptacle holding a physical adsorbent sorptively retaining a material to be dispensed, and including a dispensing structure for discharging desorbed material from the receptacle, wherein in a body-mounted or body-worn state, body heat warms the receptacle and physical adsorbent to effect desorption and dispensing of the material from the receptacle.

16. The system of claim 9, wherein the gas comprises a gas species selected from the group consisting of organoleptic gas species, pesticidal gas species, and gaseous therapeutic agents.

17. A process according to claim 16, wherein said gas species comprises an organoleptic gas.

18. A process according to claim 16, wherein said gas species comprises a gaseous therapeutic agent.

* * * * *

UNITED STATES PATENT AND TRADEMARK OFFICE
CERTIFICATE OF CORRECTION

PATENT NO : 6,070,576

DATED : Jun. 6, 2000

INVENTOR(S) : Eugene G. Banucci, New Canaan, Conn.; Steven J. Hultquist, Raleigh, N.C.

Figure 3:
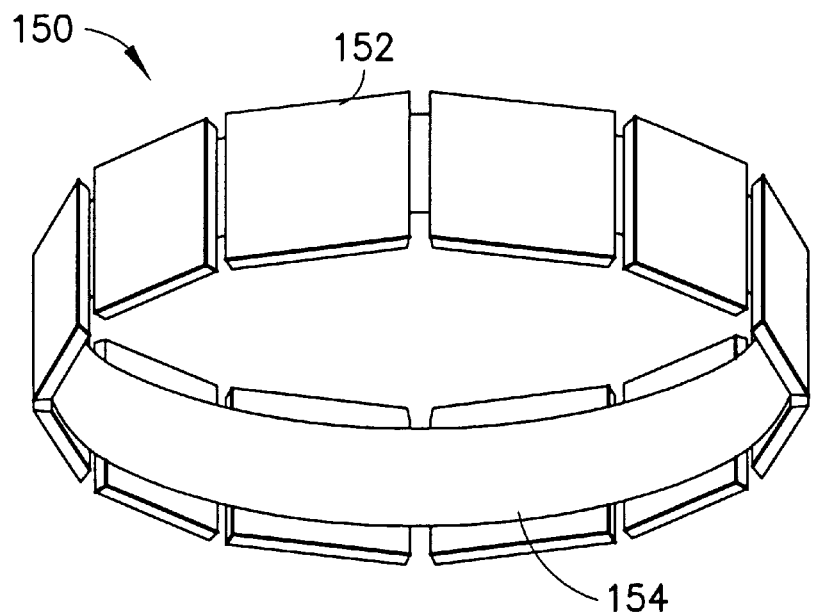
FIG. 3 is a perspective view of a physical adsorbent-based organoleptic material dispensing bracelet, which may be worn on the wrist of the wearer, utilizing body heat for effecting dispensing of the organoleptic material.
Figure 4:
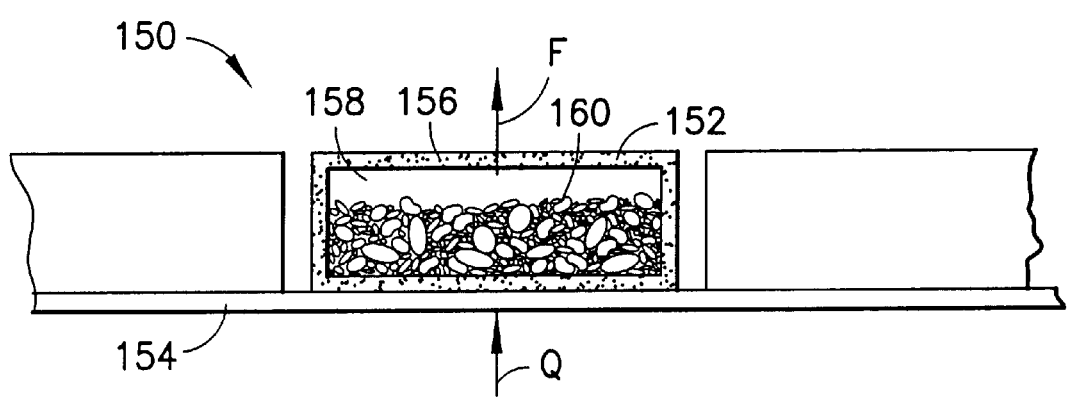
FIG. 4 is a partial section elevation view of a portion of the bracelet article of FIG. 2.

It is certified that error appears in the above-identified patent and that said Letters Patent are hereby corrected as shown below:

Column 3, line 64 change "Fig. 2" to -- Fig. 3 --.

Signed and Sealed this

Eighth Day of May, 2001

Attest:

NICHOLAS P. GODICI

Attesting Officer

Acting Director of the United States Patent and Trademark Office